United States Patent
Hester, Jr.

[11] 3,891,666
[45] June 24, 1975

[54] 6-PHENYL-S-TRIAZOLO[4,3-A][1,3,4]-BENZOTRIAZEPINES AND THEIR PREPARATION

[75] Inventor: Jackson B. Hester, Jr., Galesburg, Mich.

[73] Assignee: The Upjohn Company, Kalamazoo, Mich.

[22] Filed: Aug. 27, 1973

[21] Appl. No.: 391,647

[52] U.S. Cl...... 260/308 B; 260/471 A; 260/557 H; 260/561 H; 260/566 B; 260/578; 424/269
[51] Int. Cl. ..................... C07d 55/06; C07d 57/02
[58] Field of Search ............................... 260/308 R

[56] References Cited
UNITED STATES PATENTS
3,701,782  10/1972  Hester............................ 260/308 R OTHER PUBLICATIONS
Bowie et al., Chem. Abstracts, Vol. 77, Abstract No. 88421m (1972). QD1A51

Primary Examiner—Alton D. Rollins
Attorney, Agent, or Firm—Hans L. Berneis

[57] ABSTRACT

Compounds of the formula III:

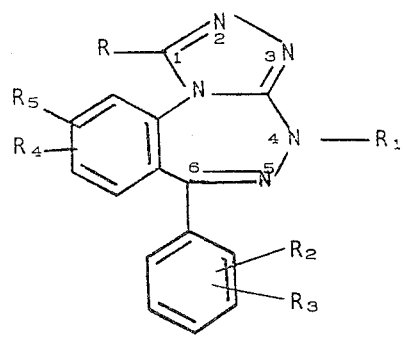

III wherein R is hydrogen, alkyl of 1 to 3 carbon atoms, inclusive, or cycloalkyl of 3 to 7 carbon atoms inclusive; wherein $R_1$ is hydrogen and alkyl defined as above; and wherein $R_2$, $R_3$, $R_4$, and $R_5$ are hydrogen, alkyl defined as above, fluorine, chlorine, bromine, nitro or alkylthio of 1 to 3 carbon atoms inclusive, are prepared by treating a compound of the formula

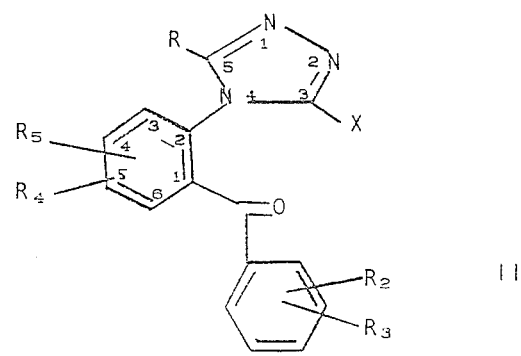

II wherein X is chlorine or bromine, and R, $R_2$, $R_3$, $R_4$, and $R_5$ are defined as above with anhydrous hydrazine or a hydrazine mineral acid salt and a base to give the compound of formula IIIA which is like III with $R_1$ as hydrogen. Alkylation of IIIA ($R_1$ is hydrogen) by conventional method gives the 4-N-alkylderivatives. Compounds II are produced from non-halogenated compounds I by halogenation with N-haloacid amides.

The compounds of formula III (including IIIA) are sedative compounds which can be used for tranquilization of mammals.

11 Claims, No Drawings

5-PHENYL-S-TRIAZOLO[4,3-A][1,3,4]-BENZOTRIAZEPINES AND THEIR PREPARATION

BRIEF SUMMARY OF THE INVENTION

1. Field of the Invention

This invention is directed to a process for organic compounds and is more particularly concerned with 6-phenyl-s-triazolo[4,3-a][1,3,4]benzotriazepines and the production thereof.

These new compounds and the process therefor are illustratively represented as follows:

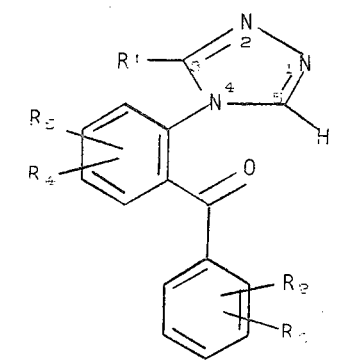

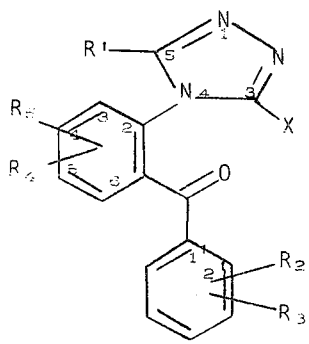

II

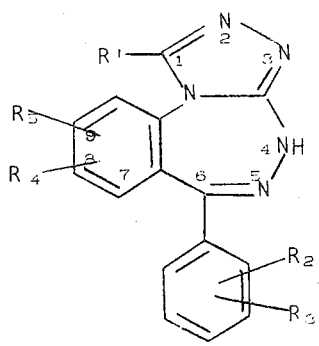

IIIA wherein $R_1$ is alkyl of 1 to 3 carbon atoms, inclusive, or cycloalkyl of 3 to 7 carbon atoms inclusive; wherein $R_2$, $R_3$, $R_4$ and $R_5$ are hydrogen, alkyl defined as above, fluorine, chlorine, bromine, nitro, or alkylthio of 1 to 3 carbon atoms, inclusive; and wherein X is chlorine or bromine.

When a compound of formula III is desired, wherein $R_1$ is defined to be alkyl, the compound IIIA of above is treated with a base and an alkyl halide, e.g., NaH as base and methyl, ethyl, propyl, or isopropyl bromide or iodide. For R is hydrogen a special process is required, shown in the preparations.

The more desirable compounds of this invention are of the formula:

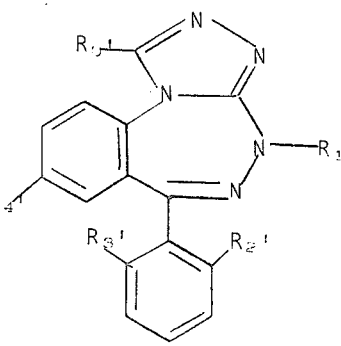

IIIB wherein $R_0'$ and $R_1$ are hydrogen or alkyl of 1 to 3 carbon atoms, inclusive; wherein $R_4'$ is hydrogen, nitro, chlorine, bromine or fluorine; and wherein $R_2'$ and $R_3'$ are hydrogen, chlorine or fluorine.

The most desirable products are of the formula:

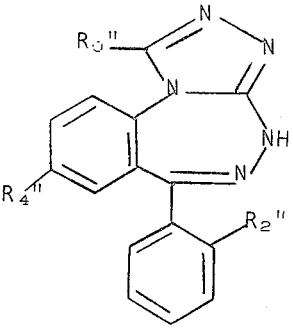

IIIC wherein $R_0''$ is hydrogen or alkyl of 1 to 3 atoms, inclusive, and $R_2''$ and $R_4''$ are hydrogen or chlorine.

This invention further comprises the pharmacologically acceptable acid addition salts of the compounds of formula III which includes the compounds of formula IIIA, IIIB, and IIIC.

The process of this invention comprises: treating a compound of formula I with an N-haloacid amide, e.g. N-bromosuccinimide, N-bromoacetamide, and the like to obtain compound II; treating a compound of formula II with anhydrous hydrazine or respectively its mineral acid salt and a base in a lower alkanol e.g. ethanol at 70°-120° C. over a length of time, to give compound IIIA. Compound IIIA can be used as is or alkylated in conventional manner e.g. alkali metal hydride or alkoxide and an alkyl halide at 25°-100° C.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkylthio of 1 to 3 carbon atoms, inclusive, is defined as lower-alkyl of 1 to 3 carbon atoms, inclusive, above.

The novel compound of formula III (including formulae IIIA, IIIB, and IIIC) and the acid addition salts thereof have sedative, tranquilizing, and muscle relaxant effects in mammals and birds.

The acid addition salts of compounds of formula III contemplated in this invention are the hydrochlorides, hydrobromides, hydriodides, sulfates, phosphates, cyclohexanesulfamates, methanesulfonates, and the like, prepared by reacting a compound of formula III with the stoichiometrically calculated amount of the selected pharmacologically acceptable acid.

Sedative effects of 8-chloro-1-methyl-6-phenyl-4H-s-triazolo[4,3-a][1,3,4]benzotriazepine are shown by the following tests in mice:

Chimney test:

[Med. Exp. 4, 145 (1961)]: The effective intraperitoneal dosage for 50% of mice ($ED_{50}$) is 1.0 mg./kg. The test determines the ability of mice to back up and out of a vertical glass cylinder within 30 seconds. At the effective dosage, 50% of the mice failed doing it.

Dish test:

Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 1.6 mg./kg.

Pedestal test:

The untreated mouse leaves the pedestal in less than a minute to climb back to the floor of the standard mouse box. Tranquilized mice will stay on the pedestal for more than 1 minute. The $ED_{50}$ (intraperitoneal administation) is 3.1 mg./kg.

Nicotine antagonism test:

Mice in a group of 6 are injected with the test compound (8-chloro-1-methyl-6-phenyl-4H-s-triazolo[4,3-a][1,3,4]benzotriazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal, dosage of 0.07 mg./kg. of the test compound protected 50% of the mice against (3) ($ED_{50}$).

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water and oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour and the like can be prepared.

As tranquilizer the compounds of formula III can be used in dosages of 0.05 –5.0 mg./kg., preferably from 0.1–2.5 mg./kg., in oral or injectable preparations as described above, to alleviate tension and anxiety in mammals, or birds, such as e.g., occurs when animals are in travel. For larger mammals (5 kg. or over) the lower dosage ranges are preferred.

Other acid addition salts of the compounds of formula III can be made such as the fluosilicic acid addition salts which are useful mothproofing compounds of the trichloroacetates useful as herbicides against Johnson grass, Bermuda grass, yellow foxtail and green foxtail, and quack grass.

The starting materials of formula I of this invention, substituted or unsubstituted are described in U.S. Pat. No. 3,709,898, and in Belgian Pat. No. 787,731. Other starting materials of formula I are synthesized as shown in the Preparations.

In carrying out the process of this invention a selected compound of formula I is halogenated with an N-haloacid amide in an inert solvent at 60°–80° C. during 1 to 6 hours. The preferred halogenation agents are N-bromoacetamide and N-bromosuccinimide or the analogous chloro compounds thereof. The inert solvent can be methylene chloride, chloroform, carbon tetrachloride or the like and the preferred temperature is the reflux temperature of the mixture. Compound II thus obtained is isolated and purified by conventional methods. Thereafter compound II and anhydrous hydrazine or a hydrazine mineral acid salt and a base are heated from 70°–120° C. in a waterfree lower-alkanol of 2–4 carbon atoms, inclusive. The hydrazine mineral acid salt is usually hydrazine hydrochloride or hydrazine sulfate and the base is usually sodium acetate. The lower alkanol is selected from ethanol, 1-propanol, 2-propanol, 1- and 2-butanol, and the like. The time of reaction is from 24–168 hours, and the temperature is preferably the refluxing temperature of the mixture. After this period the reaction mixture is neutralized with a base e.g., sodium or potassium carbonate or bicarbonate. The product, of formula IIIA is isolated by conventional procedures e.g., extraction, chromatography, crystallization, sublimation, and the like.

The alkyl derivatives of compounds IIIA can be obtained by treating the compound IIIA dissolved in an inert organic solvent with a base and then with an alkyl chloride, bromide, or iodide. The preferred solvents are N,N-dialkyl alkanoic acid amides, e.g., dimethylformamide, dimethylacetamide, diethylformamide, and the like. The base is preferably sodium or potassium hydride, methoxide, or ethoxide. The reaction of compound IIIA and the base is carried out between 20° to 100° C. for 15-60 minutes. Thereafter the selected alkylating reagent e.g., methyl, ethyl, propyl, or isopropyl bromide or iodide is added in situ and the mixture is allowed to react for 1-18 hours at 25°-100° C. The products are recovered, isolated, and purified by conventional means e.g. extraction, chromatography, and crystallization.

The following examples and preparations are illustrative of the processes and products of the present invention, but are not to be construed as limiting.

PREPARATION 1

2-amino-5-chlorobenzophenone hydrazone

A mixture of 27.2 g. (0.117 mol.) of 2-amino-5-chlorobenzophenone in 170 ml. of diethylene glycol and 23 ml. (0.45 mol.) of 99% hydrazine hydrate was refluxed a total of 7 hours. The solution was allowed to cool overnight to room temperature. The light green-colored solid which resulted was mixed with 400 ml. of water and extracted into benzene; the layers were separated and the benzene portion dried over anhydrous magnesium sulfate and concentrated. Crystallization of the residue from ether/hexane afforded 13.5 g. (46.8%) of white fluffy needles of 2-amino-5-chlorobenzophenone hydrazone of melting point 133°–133.5° C.

Anal. calcd. for $C_{13}H_{12}ClN_3$:
C, 63.55; H, 4.93; N, 17.11; Cl, 14.43.
Found: C, 63.58; H, 4.95; N, 17.32; Cl, 14.39.

A second crop (6.0 g., 21%) of needles had a melting point of 132°–134° C.

PREPARATION 2

2-amino-2',5-dichlorobenzophenone hydrazone

In the manner given in Example 1, 2-amino-2',5-dichlorobenzophenone was refluxed with hydrazine hydrate in diethylene glycol to give 2-amino-2',5-dichlorobenzophenone hydrazone.

PREPARATION 3

2-amino-5-chloro-2',6'-difluorobenzophenone hydrazone

In the manner given in Example 1, 2-amino-5-chloro-2',6'-difluorobenzophenone was refluxed with hydrazine hydrate in diethylene glycol to give 2-amino-5-chloro-2',6'-difluorobenzophenone hydrazone.

PREPARATION 4

2-amino-2'chloro-5-nitrobenzophenone hydrazone

In the manner given in Example 1, 2-amino-2'-chloro-5-nitrobenzophenone was refluxed with hydrazine hydrate in diethylene glycol to give 2-amino-2'-chloro-5-nitrobenzophenone hydrazone.

PREPARATION 5

2-aminobenzophenone hydrazone

In the manner given in Example 1, 2-aminobenzophenone was refluxed with hydrazine hydrate in diethylene glycol to give 2-aminobenzophenone hydrazone.

PREPARATION 6

2-benzyl-4-chloroaniline

Potassium hydroxide pellets (16.1 g. 245 mmol.) were ground and dissolved in 85 ml. of refluxing diethylene glycol. Volatile materials were distilled until the temperature of the liquid reached 200° C. The solution was then cooled to room temperature and 13.5 g. (54.6 mmol) of 2-amino-5-chlorobenzophenone hydrazone was added while the syrupy liquid was gently reheated. At 100° C. all the hydrazone had dissolved. The temperatue was maintained between 120°–150° C. for 45 minutes until gas evolution ceased. After a total heating period of 1.5 hour, the solution was cooled, poured onto ice and extracted with benzene. The benzene layer was separated, dried over anhydrous magnesium sulfate and concentrated to yield an orange oil. Distillation afforded 9.9 g. of 2-benzyl-4-chloroaniline (89.2%) as a yellow oil of boiling point 125°–140° C. (0.1 mm Hg).

Anal. calcd. for $C_{13}H_{12}ClN$:
C, 71.71; H, 5.56; N, 6.44; Cl, 16.28.
Found: C, 71.55; H, 5.51; N, 6.58; Cl, 16.16.

PREPARATION 7

4-chloro-α-(o-chlorophenyl)-o-toluidine

A mixture of 187.5 g. (0.702 mole) of 2-amino-2',5-dichlorobenzophenone in 1020 ml. of diethylene glycol and 138 ml. (2.76 mol.) of 99% hydrazine hydrate was refluxed for 41 hours, that is, until thin layer chromatography (Silica Gel G, eluted with 40% ether/hexane) indicated the absence of starting material. The reaction mixture was cooled carefully to about 60° C. and 241.5 g. (4.30 mol.) of ground potassium hydroxide (85%) was added. The reaction temperature rose to 100° C. The reaction mixture was heated to 140°–150° C. until gas evolution ceased. In this way, heating was maintained for 6 hours. The reaction mixture was worked up by cooling, pouring into 3.0 l. of icecold 5% aqueous sodium hydroxide and extracting with benzene. The combined benzene extracts were washed with a saturated aqueous sodium chloride solution and allowed to stand for 2 days. A by-product precipitated and was removed by filtration; the solid was washed with additional benzene. The benzene washings and the benzene layers were combined and dried over anhydrous magnesium sulfate, filtered, and concentrated to yield a red oil, which was distilled at 0.15 mm Hg and 140°–148° C. to yield 140.0 g. (71%) of yellow liquid. The oil was crystallized to yield 4-chloro-α-(o-chlorophenyl)-o-toluidine as tan plates of melting point 64.3°–65.0° C.

Anal. Calcd. for $C_{13}H_{11}Cl_2N$:
C, 61.92; H, 4.40; N, 5.56; Cl, 28.12.
Found: C, 62.00; H, 4.46; N, 5.61; Cl, 28.22.

PREPARATION 8

4-chloro-α-(2,6-difluorophenyl)-o-toluidine

In the manner given in Preparation 6, 2-amino-5-chloro-2',6'-difluorobenzophenone hydrazone was warmed with potassium hydroxide in diethylene glycol at 120°–150° C. to give 4-chloro-α-(2,6-difluorophenyl)-o-toluidene.

PREPARATION 9

2-(o-Chlorobenzyl)-4-nitroaniline

In the manner given in Preparation 6, 2-amino-2'-chloro-5-nitrobenzophenone hydrazone was warmed with potassium hydroxide in diethylene glycol at 120°–150° C. to give 2-(o-chlorobenzyl)-4-nitroaniline.

PREPARATION 10
2-Benzylaniline

In the manner given in Preparation 6, 2-aminobenzophenone hydrazone was warmed with potassium hydroxide in diethylene glycol at 120°–150° C. to give 2-benzylaniline.

PREPARATION 11
1-Acetyl-2-[N-(4-chloro-α-phenyl-o-tolyl)formimidoyl]hydrazine A mixture of 3.37 g. (15.5 mmol.) of 2-benzyl-4-chloroaniline, 5.52 g. (37.3 mmol.) of triethyl orthoformate and a catalytic amount of the starting amine hydrochloride (1 mmol.) was refluxed 5 hours to distill off ethanol. The orange solution was permitted to cool to room temperature. This crude oil was then dissolved in 25 ml. of absolute ethanol and 2.35 g. (32.0 mmol.) of acethydrazide was added. After stirring the solution for 0.5 hours, a white solid precipitated. Stirring was continued for an additional 2.5 hours and then the solid was dissolved in ethyl acetate and recrystallized from ethyl acetate/hexane to give 2.95 g. (61%) of white fine needles of 1-acetyl-2-[N-(4-chloro-α-phenyl-o-tolyl)formimidoyl]hydrazine of melting point 170.5°–173° C. The analytical sample had a melting point of 174°–175° C.

Anal. calcd. for $C_{16}H_{16}ClN_3O$:
C, 63.68; H, 5.35; N, 13.93; Cl, 11.74.
Found: C, 63.81; H, 5.22; N, 13.94; Cl, 11.57.

A second crop (0.8 g. 17%) had a melting point 157°–160° C.

PREPARATION 12
1-Propionyl-2-[N-(4-chloro-α-phenyl-o-tolyl)formimidoyl]hydrazine A mixture of 10.12 g. (46.5 mmol.) of 2-benzyl-4-chloroaniline and 16.57 g. (101.9 mmol.) of triethylorthoformate was refluxed in a 50 ml. round bottom flask to distill ethanol. After an additional 2–4 hour heating period, the liquid in the flask was permitted to cool to room temperature and the resulting reaction mixture dissolved in 100 ml. of absolute ethanol. To this solution was added 8.45 g. (96 mmol.) of propionyl hydrazide. The mixture was stirred at room temperature overnight. The solid was collected by filtration and crystallized from tetrahydrofuran-hexane to give 1-propionyl-2-[N-(4-chloro-α-phenyl-o-tolyl)formimidoyl]-hydrazine.

PREPARATION 13
1-Acetyl-2-[N-[4-chloro-α-(o-chlorophenyl)-o-tolyl]formimidoyl]hydrazine.

A mixture of 37.8 g. (0.150 mol.) of 4-chloro-α-(o-chlorophenyl)-o-tolidine and 57.0 g. of triethylorthoformate (0.385 mol.) was refluxed for 3.5 hours to distill ethanol. The oil was cooled to room temperature (22°–25° C.) and dissolved in 450 ml. of cold absolute ethanol. Acethydrazide (23.7 g.: 0.320 mol.) was added and the mixture stirred overnight. Within 1 hour after all the acethydrazide dissolved, a yellow precipitate formed. After the reaction was complete, the precipitate was filtered and washed with about 400 ml. of absolute ethanol and 100 ml. of hexane to give 46.83 g. (92.6%) of 1-acetyl-2-[N-[4-chloro-α-(o-chlorophenyl)-o-tolyl]formimidoyl]hydrazine as a white solid melting point 196.5°–199.5° C. An analytical sample had a melting point of 213°–214° C.

Anal. Calcd. for $C_{16}H_{15}Cl_2N_3O$:
C, 57.15; H, 4.50; N, 12.50; Cl, 21.09.
Found: C, 57.06; H, 4.41; N, 12.26; Cl, 21.31.

PREPARATION 14
1-Propionyl-2-[N-(4-chloro-α-(2,6-difluorophenyl)-o-tolyl]formimidoyl]hydrazine In the manner given in Preparation 11, a mixture of 4-chloro-α-(2,6-difluorophenyl)-o-toluidine and triethylorthoformate was refluxed, then after 5 hours, treated at room temperature with propionic acid hydrazide to give 1-propionyl-2-[N-[4-chloro-α-(2,6-difluorophenyl)-o-tolyl]-formimidoyl]hydrazine.

PREPARATION 15
1-Cyclopropylcarbonyl-2-]N-[α-(o-chlorophenyl)-4-nitro-o-tolyl]formimidoyl]hydrazine In the manner given in Preparation 11, a mixture of 2-(o-chlorobenzyl)-4-nitroaniline and triethylorthoformate was refluxed, then, after 5 hours, treated, at room temperature with cyclopropylcarbonyl hydrazide to give 1-cyclopropylcarbonyl-2-[N-[α-(o-chlorophenyl)-4-nitro-o-tolyl]formimidoyl]hydrazine.

PREPARATION 16
1-Cyclohexylcarbonyl-2-[N-(α-phenyl-o-tolyl)formimidoyl]hydrazine In the manner given in Preparation 11, a mixture of 2-benzylaniline and triethyl orthoformate was refluxed, then after 5 hours, treated, at room temperature, with cyclohexylcarbonyl hydrazide to give 1-cyclohexylcarbonyl-2-[N-(α-phenyl-o-tolyl)formimidoyl]hydrazine.

PREPARATION 17
1-Cycloheptylcarbonyl-2-[N-[α-(o-chlorophenyl)-4-nitro-o-tolyl]formimidoyl]hydrazine In the manner given in Preparation 11, 2-(o-chlorobenzyl)-4-nitroaniline and triethylorthoformate was refluxed, then after 5 hours treated, at room temperature, with cycloheptylcarbonyl hydrazide to give 1-cycloheptylcarbonyl-2-[N-[α(o-chlorophenyl)-4-nitro-o-tolyl]formimidoyl]-hydrazine.

PREPARATION 18
4-[4-Chloro-α-phenyl-o-tolyl]-3-methyl-4H-1,2,4-triazole

To a 1 liter flask was added 28.4 g. (94.2 mmol.) of 1-acetyl-2-[N-[4-chloro-α-phenyl-o-tolyl]formimidoyl]hydrazine and 400 ml. of diglyme. The mixture was heated to reflux; at 120° C. all the solid starting material dissolved. Pyridine (20 ml.) was added, and the solution was refluxed overnight (20 hours). About 200 ml. of pyridine, water and diglyme were removed by distillation under reduced pressure and to the remaining cold reaction solution was added 1500 ml. of (reagent grade) hexane. Trituration in an ice bath yielded 20.8 g. (78%) of 4-[4-chloro-α-phenyl-o-tolyl]-3-methyl-4H-1,2,4-triazole of melting point 135°–139° C. An analytical sample was obtained on recrystallization from ethyl acetate/hexane melting point 142° C.

Anal. calcd. for $C_{16}H_{14}ClN_3$:

C, 67.72; H, 4.97; N, 14.81; Cl, 12.50.
Found: C, 67.99; H, 4.98; N, 14.99; Cl, 12.61

PREPARATION 19

4-[4-Chloro-α-phenyl-o-tolyl]-3-ethyl-4H-1,2,4-triazole

1-Propionyl-2-[N-(4-chloro-α-phenyl-o-tolyl)formimidoyl]hydrazine was placed in a 200 ml. round bottom flask with 60 ml. of diglyme. The mixture was refluxed for 4 hours. The solution was then permitted to cool overnight. The liquid was dried with anhydrous magnesium sulfate/sodium sulfate and filtered. Hexane was added and the solution was placed in a refrigerator after scratch, to induce crystallization. The solid which formed as filtered to yield 4-(4-chloro-α-phenyl-o-tolyl)-3-ethyl-4H-1,2,4-triazole.

PREPARATION 20

4-[4-Chloro-α-(o-chlorophenyl)-o-tolyl]-3-methyl-4H-1,2,4-triazole

1-Acetyl-2-[N-[4-chloro-α-(o-chlorophenyl)-o-tolyl]-formimidoyl]hydrazine (33.62 g., 0.100 mol.) was heated in 400 ml. of diglyme for 28 hours so that the starting material was no longer present. The diglyme, pyridine and water were removed in vacuo to give a brown solid residue which began to crystallize on standing. Recrystallization from ethyl acetate gave 4-[4-chloro-α-(o-chlorophenyl)-o-tolyl]-3-methyl-4H-1,2,4-triazole in two crops: 17.3 g. (55%) and 3.9 g. (11.5%). The melting point was 159.5°–162°C.

Anal. calcd. for $C_{16}H_{13}Cl_2N_3O$:
C, 60.39; H, 4.12; N, 13.21; Cl, 22.28.
Found: C, 60.13; H, 4.02; N, 13.34; Cl, 22.52.

PREPARATION 21

4-[4-Chloro-α-(2,6-difluorophenyl)-o-tolyl]-3-ethyl-4H-1,2,4-triazole

In the manner given in Preparation 18, 1-propionyl-2-[N-[4-chloro-α-(2,6-difluorophenyl)-o-tolyl]formimidoyl]hydrazine was heated with diglyme and pyridine to give 4-[4-chloro-α-(2,6-difluorophenyl)-o-tolyl]-3-ethyl-4H-1,2,4-triazole.

PREPARATION 22

4-[α-(o-chlorophenyl)-4-nitro-o-tolyl]-3-cyclopropyl-4H-1,2,4-triazole

In the manner given in Preparation 18, 1-cyclopropylcarbonyl-2-[N-[α-(o-chlorophenyl)-4-nitro-o-tolyl]formimidoyl]hydrazine was heated with diglyme and pyridine to give 4-[α-(o-chlorophenyl)-4-nitro-o-tolyl]-3-cyclopropyl-4H-1,2,4-triazole.

PREPARATION 23

4(α-phenyl-o-tolyl-3-cyclohexyl-4H-1,2,4-triazole

In the manner given in Preparation 18, 1-cyclohexylcarbonyl-2-[N-(α-phenyl-o-tolyl)formimidoyl]hydrazine was heated with diglyme and pyridine to give 4-[α-phenyl-o-tolyl]-3-cyclohexyl-4H-1,2,4-triazole.

PREPARATION 24

4[α-(o-chlorophenyl)-4-nitro-o-tolyl]-3-cycloheptyl-4H-1,2,4-triazole

In the manner given in Preparation 18, 1-cycloheptylcarbonyl-2-[N-[α-(o-chlorophenyl)-4nitro-o-tolyl]formimidoyl]hydrazine was heated with diglyme and pyridine to give 4-[α-(o-chlorophenyl)-4-nitro-o-tolyl]-3-cycloheptyl-4H-1,2,4-triazole.

PREPARATION 25

5-Chloro-2-(3-methyl-4H-1,2,4-triazol-4yl)benzophenone

Jones' Reagent (0.5 ml.), was added to a solution of 4-(4-chloro-α-phenyl-o-tolyl)-3-methyl-4H-1,2,4-triazole (0.285 g., 1.00 mmol.) in 1 ml. of glacial acetate acid. The solution was stirred for 2 hours at room temperature and 4 hours at reflux (steam bath). An additional 0.5 ml. of Jones' Reagent was added and the solution was refluxed for 1 more hour. The reaction mixture was poured into 50 ml. of 5% aqueous sodium hydroxide and extracted with chloroform. The chloroform extract was dried over anhydrous magnesium sulfate and concentrated on a rotary evaporator (Roto Vap) to leave a yellow solid. Crystallization from ethyl acetate/hexane afforded 180 mg. (61%) of 5-chloro-2-(3-methyl-4H-1,2,4-triazol-4-yl)benzophenone as white prisms of melting point 164°–166° C. Recrystallization changed the melting point to 167.5°–169° C. identical to that of an authentic sample.

PREPARATION 26

2',5-dichloro-2-(3-methyl-4H-1,2,4-triazol-4-yl)benzophenone

In a 10 ml. flask, 315 mg. (0.99 mmol.) of 4-[4-chloro-α-(o-chlorophenyl)-o-tolyl]-3-methyl-4H-1,2,4-triazole was dissolved in 1.0 ml. of acetic acid and 1.0 ml. of Jones' reagent. The mixture was refluxed for 2 hours and worked up by quenching in 40 ml. of 7% aqueous sodium hydroxide and extracting with chloroform. The organic layer was dried and crystallized from ethyl acetate:hexane (1:2) to give 170 mg. of 2',5-dichloro-2-(3-methyl-4H-1,2,4-triazol-4-yl)benzophenone as prisms of melting point 147.5°–148.5°C.

Anal. calcd. for $C_{16}H_{11}ClN_{23}O$:
C, 57.84; H, 3.34; N, 12.65; Cl, 21.35.
Found: C, 57.70; H, 3.21; N, 12.47; Cl, 21.58.

PREPARATION 27

5-Chloro-2',6'-difluoro-2-(3-methyl-4H-1,2,4triazol-4-yl)benzophenone

In the manner given in Preparation 25, 4-[4-chloro-α-(2,6-difluorophenyl)-o-tolyl]-3-methyl-4H-1,2,4-triazole was oxidized with Jones' reagent to give 4-chloro--nitro-,6'-difluoro-2-(3-methyl-4H-1,2,4-triazol-4-yl)benzophenone.

PREPARATION 28

2'-Chloro-5-nitro-2-(3-cyclopropyl-4H-1,2,4-triazol-4-yl)benzophenone

In the manner given in Preparation 25, 4-[α-(o-chlorophenyl)-4-nitro-o-tolyl]-3-cyclopropyl-4H-1,2,4-triazole was oxidized with Jones' reagent to give 2'-chloro-5nitro-2-(3-cyclopropyl-4H-1,2,4-triazol-4-yl)benzophenone.

PREPARATION 29

2-(3-Cyclohexyl-4H-1,2,4-triazol-4-yl)benzophenone

In the manner given in Preparation 25, 4-[α-(phenyl)-o-tolyl]-3-cyclohexyl-4H-1,2,4-triazole was oxidized with Jones' reagent to give 2-(3-cyclohexyl-4H-1,2,4-triazol-4-yl)benzophenone.

PREPARATION 30

2'-chloro-5-nitro-2-(3-cycloheptyl-4H-1,2,4-triazol-4-yl)benzophenone

In the manner given in Preparation 25, 4-[α-(o-chlorophenyl)-4-nitro-o-tolyl]-3-cycloheptyl-4H-1,2,4-triazole was oxidized with Jones' reagent to give 2'-chloro-5-nitro-2-(3-cycloheptyl-4H-1,2,4-triazol-4-yl)benzophenone.

PREPARATION 31

5-Chloro-2-(3-ethyl-4H-1,2,4-triazole-4-yl)benzophenone

Jones' reagent (1.5 ml.) was added to a solution of 5-(4-chloro-α-phenyl-o-tolyl)-3-ethyl-4H-1,2,4-triazole (2.00 mmol.) in 2 ml. of glacial acetic acid. The mixture was refluxed gently on a steam bath. After 1.5 hours of reflux, the solution had become dark green in color. A small portion was removed and quenched in 5% sodium hydroxide and extracted with chloroform, dried over anhydrous magnesium sulfate, and concentrated and analyzed by thin layer chromatography. An additional 1.5 ml. of Jones' reagent was added and the refluxing continued for another 3.5 hours. The reaction was permitted to cool to room temperature overnight and worked up as described above to give a solid which was recrystallized from chloroform hexane to give 5-chloro-2-(3-ethyl-4H-1,2,4-triazol-4-yl)benzophenone.

PREPARATION 32

1-Ethoxyoxalyl-2-[N-(4-chloro-α-phenyl-o-tolyl)formimidoyl]hydrazine

In the manner given in Preparation 11, 2-benzyl-4-chloroaniline, triethylorthoformate with a small amount of hydrochloric acid was refluxed for 5 hours to distill off ethanol formed in the reaction. To the resulting reaction mixture was added ethyl oxalyl hydrazide

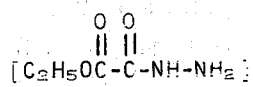

and ethanol, and the mixture was heated for ½ hour, after which a precipitate formed. This precipitate was collected on a filter, washed, and recrystallized from ethyl acetate/hexane to give 1-ethoxyoxalyl-2-[N-(4-chloro-α-phenyl-o-tolyl)formimidoyl]hydrazine.

PREPARATION 33

4(4-Chloro-α-phenyl-o-tolyl)-3-ethoxycarbonyl-4H-1,2,4-triazole

In the manner given in preparation 18, 1-ethoxyoxalyl-2-[N-(4-chloro-α-phenyl-o-tolyl)formimidoyl]hydrazine was cyclized by heating with diglyme and pyridine to give 4-(4-chloro-α-phenyl-o-tolyl)-3-ethoxycarbonyl-4H-1,2,4-triazole.

PREPARATION 34

5-Chloro-2-[3-carbethoxy-4H-1,2,4-triazol-4-yl]benzophenone

In the manner given in Preparation 25, a solution of 4-(4-chloro-α-phenyl-o-tolyl)-3-ethoxycarbonyl-4H-1,2,4-triazole in glacial acetic acid was oxidized with Jones' reagent to give 5-chloro-2-[3-carbethoxy-4H-1,2,4-triazole-4-yl]benzophenone.

In the manner given in the proceding preparations other 2-(3-substituted-4H-1,2,4-triazol-4-yl)benzophenones compounds can be produced from the corresponding 2-aminobenzophenones. Representative compounds, thus obtained include:

3'-fluoro-5-bromo-2-(3-propyl-4H-1,2,4-triazol-4-yl)benzophenone;

2'-bromo-6-fluoro-2-(3-cyclobutyl-4H-1,2,4-triazol-4-yl)benzophenone;

8-bromo-3'-methylthio-2-(3-cycloheptyl-4H-1,2,4-triazol-4-yl)benzophenone;

4'-fluoro-4-propyl-2-(3-ethyl-4H-1,2,4-triazol-4-yl)benzophenone;

2',4'-difluoro-4-isopropyl-2-[3-methyl-4H-1,2,4-triazol-4-yl]benzophenone;

2,4-difluoro-2-(3-isopropoxycarbonyl-4H-1,2,4-triazol-4-yl)benzophenone;

5-chloro-3'-nitro-2-[3-methyl-4H-1,2,4-triazol-4-yl]-benzophenone;

5-bromo-2'-fluoro-2-(3-methyl-4H-1,2,4-triazol-4-yl)benzophenone;

5-bromo-2-(3-methyl-4H-1,2,4-triazol-4-yl)benzophenone;

5-fluoro-2-(3-methyl-4H-1,2,4-triazol-4-yl)benzophenone;

5-chloro-2'-fluoro-2-(3-methyl-4H-1,2,4-triazol-4-yl)benzophenone;

5-methythio-2-(3-methyl-4H-1,2,4-triazol-4-yl)benzophenone; and the like.

EXAMPLE 1

5-Chloro-2-(3-bromo-5-methyl-4H-1,2,4-triazol-4-yl)benzophenone

A stirred mixture of 5-chloro-2-[3-methyl-4H-1,2,4-triazol-4-yl]benzophenone (2.98 g., 0.01 mole), N-bromosuccinimide (1.96 g., 0.011 mole) and carbon tetrachloride (200 ml.) is refluxed under nitrogen for 3 hours, cooled and treated with chloroform to dissolve the precipitate. The solution is washed with water, dried over anhydrous magnesium sulfate and concentrated in vacuo. The residue is crystallized from methanol-ethyl acetate to give 5-chloro-2-(3-bromo-5-methyl-4H-1,2,4-triazol-4-yl)benzophenone in 3 crops: 0.22 g. of melting point 197.5°–199° C.; 0.71 g. of melting point 196°–197.5° C. and 1.11 g. of melting point 192°–194° C. (60% yield). The analytical sample had a melting point 200°–201° C.

Anal. calcd. for $C_{16}H_{11}BrClN_3O$:
C, 51.02; H, 2.94; Br, 21.22; Cl, 9.41; N, 11.16.
Found: C, 50.23; H, 2.88; Br, 21.19; Cl, 9.48; N, 11.17.

EXAMPLE 2

8-Chloro-1-methyl-6-phenyl-4H-s-triazolo[4,3-a]-[1,3,4]benzotriazepine

A stirred mixture of 5-chloro-2-(3-bromo-5-methyl-4H-1,2,4-triazol-4-yl)benzophenone (1.7 g., 0.005 mole), hydrazine sulfate (1.95 g., 0.015 mole), sodium acetate (2.87 g., 0.035 mole) and absolute ethanol (50 ml.) is refluxed, under nitrogen for 41 hours 30 minutes. The mixture is concentrated in vacuo and the residue is mixed with water, treated with sodium bicarbonate and extracted with chloroform. The extract is washed with brine, dried over anhydrous potassium carbonate and concentrated. The residue is chromatographed on silica gel (100 g.) with 2% methanol–98% chloroform. The first compound eluted from the column is crystallized from methanol-ethyl acetate to give 0.267 g. of recovered starting product.

The second compound eluted from the column is crystallized to give 0.702 g. of 8-chloro-1-methyl-6-phenyl-4H-s-triazolo[4,3-a] [1,3,4]benzotriazepeine as a solvate. This material foams at 152°–153°, begins to resolidify at about 160° and then remelts at about 205°–216°. The analytical sample is prepared by subliming a sample of this material at 200° C. (0.5–0.1 mm Hg); it had a melting point of 241°–245° C.

Anal. calcd. for $C_{16}H_{12}ClN_5$:
C, 62.04; H, 3.91; Cl, 11.44; N, 22.61.
Found: C, 62.34; H, 3.96; Cl, 11.51; N, 22.68.

EXAMPLE 3

5-Chloro-2-(3-bromo-5-ethyl-4H-1,2,4-triazol-4-yl)benzophenone

In the manner given in Example 1, 5-chloro-2-(3-ethyl-4H-1,2,4-triazol-4-yl)benzophenone is reacted with N-bromosuccinimide in carbon tetrachloride to give 5-chloro-2-(3-bromo-5-ethyl-4H-1,2,4-triazol-4-yl)benzophenone.

EXAMPLE 4

8-Chloro-1-ethyl-6-phenyl-4H-s-triazolo[4,3-a] [1,3,4]benzotriazepine

In the manner given in Example 2, 5-chloro-2-(3-bromo-5-ethyl-4H-1,2,4-triazol-4-yl)benzophenone is reacted with hydrazine sulfate and potassium acetate to give 8-chloro-1-ethyl-6-phenyl-4H-s-triazolo[4,3-a][1,3,4]benzotriazepine.

EXAMPLE 5

2',5-dichloro-2-(3-bromo-5-methyl-4H-1,2,4-triazol-4-yl)benzophenone

In the manner given in Example 1, 2',5-dichloro-(3-methyl-4H-1,2,4-triazol-4-yl)benzophenone is reacted with N-bromosuccinimide in carbon tetrachloride to give 2',5-dichloro-2-(3-bromo-5-methyl-4H-1,2,4-triazol-4-yl)benzophenone.

EXAMPLE 6

8-Chloro-1-methyl-6-(o-chlorophenyl)-4H-s-triazolo[4,3-a][1,3,4]benzotriazepine

In the manner given in Example 2, 2',5-dichloro-2-(3-bromo-5-methyl-4H-1,2,4-triazol-4-yl)benzophenone is reacted with hydrazine sulfate and potassium acetate to give 8-chloro-1-methyl-6-(o-chlorophenyl)-4H-s-triazolo[4,3-a][1,3,4]benzotriazepine.

EXAMPLE 7

5-Chloro-2',6'-difluoro-2-(3-bromo-5-methyl-4H-1,2,4-triazol-4-yl)benzophenone

In the manner given in Example 1, 5-chloro-2',6'-difluoro-2-(3-methyl-4H-1,2,4-triazol-4-yl)benzophenone is reacted with N-bromoacetamide in chloroform to give 5-chloro-2',6'-difluoro-2-(3-bromo-5-methyl-4H-1,2,4-triazol-4-yl)benzophenone.

EXAMPLE 8

8-Chloro-1-methyl-6-(2',6',-difluorophenyl)4H-s-triazolo[4,3-a][1,3,4]benzotriazepine In the manner given in Example 2, 5-chloro-2',6'-difluoro-2-(3-bromo-5-methyl-4H-1,2,4-triazol-4-yl)benzophenone is reacted with hydrazine sulfate and potassium acetate to give 8-chloro-1-methyl-6-(2',6'-difluorophenyl)-4H-s-triazolo[4,3-a][1,3,4]benzotriazepine.

EXAMPLE 9

2'-Chloro-5-nitro-2-[3-bromo-5-cyclopropyl-4H-1,2,4-triazol-4-yl]benzophenone

In the manner given in Example 1, 2'-chloro-5-nitro-2-[3-cyclopropyl-4H-1,2,4-triazol-4-yl]benzophenone is reacted with N-bromosuccinimide in carbon tetrachloride to give 2'-chloro-5-nitro-2-[3-bromo-5-cyclopropyl-4H-1,2,4-triazol-4-yl]benzophenone.

EXAMPLE 10

8-Nitro-1-cyclopropyl-6-(o-chlorophenyl)-4H-s-triazolo[4,3-a][1,3,4]benzotriazepine In the manner given in Example 2, 2'-chloro-5-nitro-2-[3-bromo-5-cyclopropyl-4H-1,2,4-triazol-4-yl]benzophenone is reacted with hydrazine sulfate and potassium acetate to give 8-nitro-1-cyclopropyl-6-(o-chlorophenyl)-4H-s-triazolo[4,3-a][1,3,4]benzotriazepine.

EXAMPLE 11

2-(3-Chloro-5-cyclohexyl-4H-1,2,4-triazol-4-yl)-benzophenone

In the manner given in Example 1, 2-(3-cyclohexyl-4H-1,2,4-triazol-4-yl)benzophenone is reacted with N-chloroacetamide in carbon tetrachloride to give 2-(3-chloro-5-cyclohexyl-4H-1,2,4-triazol-4-yl)benzophenone.

EXAMPLE 12

1-Cyclohexyl-6-phenyl-4H-s-triazolo[4,3-a][1,3,4]benzotriazepine

In the manner given in Example 2, 2-(3-chloro-5-cyclohexyl-4H-1,2,4-triazol-4-yl)benzophenone is reacted with hydrazine sulfate and potassium acetate to give 1-cyclohexyl-6-phenyl-4H-s-triazolo[4,3-a][1,3,4]benzotriazepine.

EXAMPLE 13

2'-chloro-5-nitro-2-(3-bromo-5-cycloheptyl-4H-1,2,4-triazol-4-yl)benzophenone

In the manner given in Example 1, 2'-chloro-5-nitro-2-[3-cycloheptyl-4H-1,2,4-triazol-4-yl]benzophenone is reacted with N-bromoacetamide in carbon tetrachloride to give 2'-chloro-5-nitro-2-(3-bromo-5-cycloheptyl-4H-1,2,4-triazol-4-yl)benzophenone.

EXAMPLE 14

8-Nitro-1-cycloheptyl-6-(o-chlorophenyl)-4H-s-triazolo[4,3-a][1,3,4]benzotriazpine In the manner given in Example 2, 2'-chloro-5-nitro-2-(3-bromo-5-cycloheptyl-4H-1,2,4-triazol-4-yl)benzophenone is reacted with hydrazine sulfate and potassium acetate to give 8-nitro-1-cycloheptyl-6-(o-chlorophenyl)-4H-s-triazolo[4,3-a][1,3,4]benzotriazepine.

EXAMPLE 15

5-Chloro-2-(3-chloro-5-carbethoxy-4H-1,2,4-triazol-4-yl)benzophenone

In the manner given in Example 1, 5-chloro-2-(3-carbethoxy-4H-1,2,4-triazol-4-yl)benzophenone is reacted with N-chloroacetamide in carbon tetrachloride to give 5-chloro-2-(3-chloro-5-carbethoxy-4H-1,2,4-triazol-4-yl)benzophenone.

EXAMPLE 16

5-Chloro-2-(3-chloro-4H-1,2,4-triazol-4-yl)benzophenone

A solution of 5-chloro-2-(3-chloro-5-carbethoxy-4H-1,2,4-triazol-4-yl)benzophenone in aqueous ethanol containing sodium hydroxide is allowed to stand at room temperature for 1 hour. The mixture is then neutralized with hydrochloric acid.

Thereafter the mixture is heated to reflux during 2 hours, allowed to cool, water is added and the precipitated product removed by filtration. After recrystallization from ethyl acetate 5-chloro-2-(3-chloro-4H-1,2,4-triazol-4-yl)benzophenone is obtained.

EXAMPLE 17

8-Chloro-6-phenyl-4H-s-triazolo[4,3-a][1,3,4]benzotriazepine

In the manner given in Example 2, 5-chloro-2-(3-chloro-4H-1,2,4-triazol-4-yl)benzophenone is reacted with hydrazine sulfate and potassium acetate to give 8-chloro-6-phenyl-4H-s-triazolo[4,3-a][1,3,4]benzotriazepine.

EXAMPLE 18

8-Chloro-1,4-dimethyl-6-phenyl-4H-s-triazolo[4,3-a][1,3,4]benzotriazepine

A solution of 8-chloro-1-methyl-6-phenyl-4H-s-triazolo[4,3-a][1,3,4]benzotriazepine(0.31 g., 0.001 mole) in dimethylformamide (25 ml.) is treated at 25° C. with 0.046 g. (0.0011 mole) of a 57% mineral oil suspensions of sodium hydride. The mixture is stirred for 30 minutes and methyl iodide is then added to the mixture. The reaction mixture is stirred for 2 hours, poured into excess water and extracted with methylene chloride. The extract is washed with brine, dried with anhydrous sodium sulfate and concentrated. The residue is crystallized from methonalethyl acetate-Skellysolve B hexanes to give 8-chloro-1,4-dimethyl-6-phenyl-4H-s-triazolo[4,3-a][1,3,4]benzotriazepine (0.22 g.) of melting point 227°-230° C.

Anal. calcd. for $C_{17}H_{14}ClN_5$:

C, 63.06; H, 4.36; Cl, 10.95; N, 21.63.

Found: C, 62.96; H, 4.39; Cl, 11.18; N, 21.60.

EXAMPLE 19

8-Chloro-1-ethyl-4-propyl-6-phenyl-4H-s-triazolo[4,3-a][1,3,4]benzotriazepine

In the manner given in Example 18, 8-chloro-1-ethyl-6-phenyl-4H-s-triazolo[4,3-a][1,3,4]benzotriazepine is first treated with sodium hydride and then with propyl bromide to give 8-chloro-1-ethyl-4-propyl-6-phenyl-4H-s-triazolo[4,3-a][1,3,4]benzotriazepine.

EXAMPLE 20

8-Chloro-1,4-dimethyl-6-(o-chlorophenyl)-[4H-s-triazolo[4,3-a][1,3,4]benzotriazepine In the manner given in Example 18, 8-chloro-1-methyl-6-(o-chlorophenyl)-4H-s-triazolo[4,3-a][1,3,4]benzotriazepine is first treated with sodium hydride and then with methyl iodide to give 8-chloro-1,4-dimethyl-6-(o-chlorophenyl)-4H-s-triazolo[4,3-a][1,3,4]benzotriazepine.

EXAMPLE 21

8-Nitro-1-cyclopropyl-4-ethyl-6-(o-chlorophenyl)-4H-s-triazolo[4,3-a][1,3,4]benzotriazepine In the manner given in Example 18, 8-nitro-1-cyclopropyl-6-(o-chlorophenyl)-4H-s-triazolo[4,3-a][1,3,4]benzotriazepine is first treated with sodium hydride and then with ethyl bromide to give 8-nitro-1-cyclopropyl-4-ethyl-6-(o-chlorophenyl)-4H-s-triazolo[4,3-a][1,3,4]benzotriazepine.

EXAMPLE 22

8-Chloro-4-isopropyl-6-phenyl-4H-s-triazolo[4,3-a][1,3,4]benzotriazepine

In the manner given in Example 18, 8-chloro-6-phenyl-4H-s-triazolo[4,3-a][1,3,4]benzotriazepine is first treated with sodium hydride and then with isopropyl iodide to give 8-chloro-4-isopropyl-6-phenyl-4H-s-triazolo[4,3-a][1,3,4]benzotriazepine.

EXAMPLE 23

5-Methylthio-2-(3-bromo-5-methyl-4H-1,2,4-triazol-4-yl)benzophenone

A solution of 5-methylthio-2-(3-bromo-5-carbethoxy-4H-1,2,4-triazol-4-yl)benzophenone in aqueous ethanol containing sodium hydroxide is allowed to stand at room temperature for 1 hour. The mixture is then neutralized with hydrochloric acid.

Thereafter the mixture is heated to reflux during 2 hours, allowed to cool, water is added and the precipitated product removed by filtration. After recrystallization from ethyl acetate 5-methylthio-2-(3-bromo-5-methyl-4H-1,2,4-triazol-4-yl)benzophenone is obtained.

EXAMPLE 24

8-Methylthio-1-methyl-6-phenyl-4H-s-triazolo[4,3-a][1,3,4]benzotriazepine

In the manner given in Example 2, 5-methylthio-2-(3-bromo-5-methyl-4H-1,2,4-triazol-4-yl)benzophenone is reacted with hydrazine sulfate and potassium acetate to give 8-methylthio-1-methyl-6-phenyl-4H-s-triazol[4,3-a][1,3,4]benzotriazepine.

In the same manner described in the proceding examples other compounds of formula III are obtained. Representative compounds thus obtained include:

1-propyl-6-(m-fluorophenyl)-4H-s-triazolo[4,3-a][1,3,4]benzotriazepine;
1,4-dipropyl-6-(m-fluorophenyl)-4H-s-triazolo[4,3-a][1,4]benzotriazepine;
7-bromo-1-cyclobutyl-6-(o-bromophenyl)-4H-s-triazolo[4,3-a][1,3,4]benzotriazepine;
8-bromo-1-cycloheptyl-6-(m-methylthiophenyl)-4H-s-triazolo[4,3-a][1,3,4]benzotriazepine;
8-bromo-1-cycloheptyl-4-methyl-6-(m-ethylthiophenyl)-4H-s-triazolo[4,3-a][1,3,4]benzotriazepine;
9-propyl-1-ethyl-6-(p-fluorophenyl)-4H-s-triazolo[4,3-a][1,3,4]-benzotriazepine;
9-isopropyl-1-methyl-6-(2,4-difluorophenyl)-4H-s-triazolo[4,3-a][1,3,4]benzotriazepine;
4,9-diisopropyl-1-methyl-6-(2,4-difluorophenyl)-4H-s-triazolo[4,3-a][1,3,4]benzotriazepine;
9-isopropyl-1,4-dimethyl-6-(2,4-difluorophenyl)-4H-s-triazolo[4,3-a][1,3,4]benzotriazepine;
7,9-difluoro-6-phenyl-4H-s-triazolo[4,3-a][1,3,4]benzotriazepine;
7,9-difluoro-4-ethyl-6-phenyl-4H-s-triazolo[4,3-a][1,3,4]benzotriazepine;
8-chloro-1,4-dimethyl-6-(o-fluoro)-4H-s-triazolo-[4,3-a][1,3,4]benzotriazepine;
8-chloro-1-cyclopropyl-6-(o-chlorophenyl)-4H-s-triazolo[4,3-a][1,3,4]benzotriazepine;
8-chloro-1-cyclopropyl-4-methyl-6-(m-nitrophenyl)-4H-s-triazolo[4,3-a][1,3,4]benzotriazepine;
1-methyl-6-(o-chlorophenyl)-4H-s-triazolo[4,3-a][1,3,4]benzotriazepine;
1-methyl-6-phenyl-4H-s-triazolo[4,3-a][1,3,4]benzotriazepine;
1-cyclopropyl-8-chloro-6-phenyl-4H-s-triazole[4,3-a][1,3,4]benzotriazepine;
1-cyclopropyl-6-(o-chlorophenyl)-4H-s-triazolo[4,3-a][1,4]benzotriazepine;
1-cyclopropyl-6-phenyl-4H-s-triazolo[4,3-a][1,3,4]benzotriazepine;
8-bromo-6-(o-fluorophenyl)-1-methyl-4H-s-triazolo[4,3-a][1,3,4]benzotriazepine;
8-bromo-1-methyl-6-phenyl-4H-s-triazolo[4,3-a][1,3,4]benzotriazepine;
8-fluoro-1-methyl-6-phenyl-4H-s-triazolo[4,3-a][1,3,4]benzotriazepine;
8-nitro-1-methyl-6-phenyl-4H-s-triazolo[4,3-a][1,3,4]benzotriazepine;
and the like.

Treatment of the compounds of formula III (including IIIA, IIIB, and IIIC) with a pharmacologically acceptable acids such as hydrochloric, hydrobromic, phosphoric, sulfuric, acetic, propionic, toluenesulfonic, naphthalen-β-sulfonic, methanesulfonic, tartaric, citric, lactic, malic, maleic, or cyclohexanesulfamic acid produces the pharmacologically acceptable salts of these compounds of formula III. The salts can be used for the same purposes as the free base compounds of formula III.

Salt formation is achieved in conventional manner by reacting the compounds of formula III with an excess of a selected acid in a suitable medium e.g., water, alkanol, ether, or acetone and recovering the salt by evaporating the solvent, preferably in vacuo.

I claim:

1. A compound of the formula

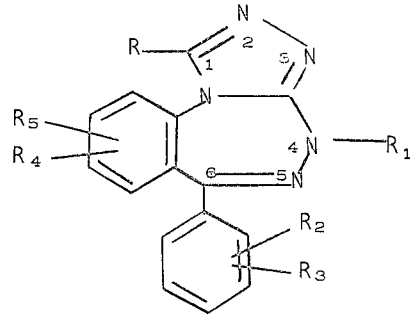

wherein R is hydrogen or alkyl of 1 to 3 carbon atoms, inclusive, or cycloalkyl of 3 to 7 carbon atoms, inclusive; wherein $R_1$ is hydrogen and alkyl defined as above; and wherein $R_2$, $R_3$, $R_4$, and $R_5$ are hydrogen, alkyl defined as above, fluorine, chlorine, bromine, nitro, or alkylthio of 1 to 3 carbon atoms, inclusive, and the pharmacologically acceptable acid addition salts thereof.

2. A compound according to claim 1 of the formula:

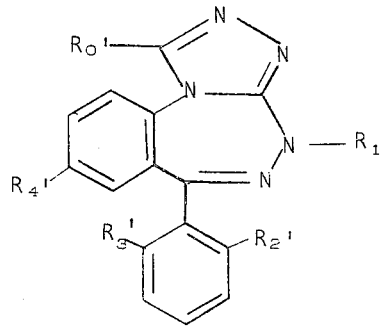

wherein $R_0'$ and $R_1$ are hydrogen or alkyl of 1 to 3 carbon atoms, inclusive; wherein $R_4'$ is hydrogen, nitro, chlorine, bromine, or fluorine and wherein $R_2'$ and $R_3'$ are hydrogen, chlorine or fluorine and the pharmacologically acceptable acid addition salts thereof.

3. A compound according to claim 1 of the formula

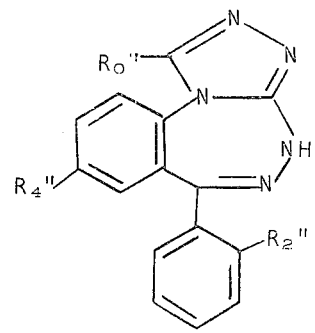

wherein $R_0''$ is hydrogen or alkyl of 1 to 3 carbon atoms, inclusive; and wherein $R_2''$ and $R_4''$ are hydrogen or chlorine, and the pharmacologically acceptable addition salts thereof.

4. A compound according to claim 3 wherein $R_0''$ is methyl, $R_2''$ is hydrogen, $R_4''$ is chloro so that the compound is 8-chloro-1-methyl-6-phenyl-4H-s-triazolo[4,3-a][1,3,4]benzotriazepine.

5. A compound according to claim 3, wherein $R_0''$ is methyl, $R_2''$ and $R_4''$ are chloro so that the compound is 8-chloro-1-methyl-6-(o-chlorophenyl)-4H-s-triazolo[4,3-a][1,3,4]benzotriazepine.

6. A compound according to claim 1 wherein R and $R_1$ are methyl, $R_2$, $R_3$, and $R_5$ are hydrogen, $R_4$ is 8-chloro and the compound is therefore 8-chloro-1,4-dimethyl-6-phenyl-4H-s-triazolo[4,3-a][1,4]benzotriazepine.

7. A compound according to claim 1, wherein R is cyclopropyl, $R_1$, $R_3$, and $R_5$ are hydrogen, $R_2$ is o-chloro, $R_4$ is nitro and the compound is therefore 8-nitro-1-cyclopropyl-6-(o-chlorophenyl)-4H-s-triazolo[4,3-a][1,3,4]benzotriazpine.

8. A compound according to claim 3 wherein $R_0''$ and $R_2''$ are hydrogen, $R_4''$ is chloro and the compound is therefore 8-chloro-6-phenyl-4H-triazolo[4,3-a][1,3,4]benzotriazepine.

9. A process for the production of a compound of the formula IIIA

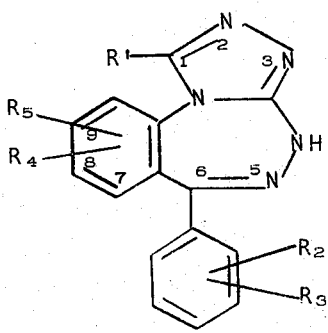

IIIA wherein R' is alkyl of 1 to 3 carbon atoms, inclusive, or cycloalkyl of 3 to 7 carbon atoms, inclusive; $R_2$, $R_3$, $R_4$, and $R_5$ are hydrogen, alkyl defined as above, fluorine, chlorine, bromine, nitro, or alkylthio of 1 to 3 carbon atoms inclusive, which comprises: treating a compound of the formula

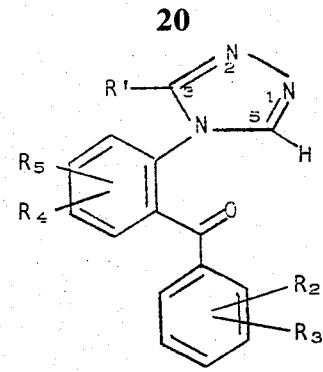

wherein R', $R_2$, $R_3$, $R_4$, and $R_5$ are defined as above with a N-haloacid amide in which halogen is chlorine or bromine in an inert organic solvent, at 60° to 80° C. to obtain a compound of formula II:

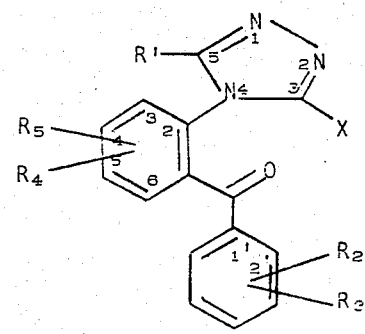

wherein X is chlorine or bromine, and $R_2$, $R_3$, $R_4$, and $R_5$ are defined as above; heating compound II with anhydrous hydrazine or a hydrazine mineral acid salt and a base to 70°–120° C. in an alkanol of 2 to 4 carbon atoms, inclusive, for 12 to 168 hours to obtain the compound of formula IIIA above.

10. The process of claim 9 wherein the N-haloacid amide is N-bromosuccinimide.

11. The process of claim 10 wherein the solvent during the halogenation is carbon tetrachloride.

* * * * *